United States Patent [19]

Brogan

[11] 4,223,053

[45] Sep. 16, 1980

[54] TRUSS CORE PANELS

[75] Inventor: Joseph Brogan, Kent, Wash.

[73] Assignee: The Boeing Company, Seattle, Wash.

[21] Appl. No.: 931,325

[22] Filed: Aug. 7, 1978

[51] Int. Cl.² ............... B32B 1/08; E04C 3/16; B32B 3/12; B32B 3/20

[52] U.S. Cl. ............... 428/35; 52/642; 52/648; 52/690; 428/174; 428/167; 428/188; 428/260; 428/273; 428/290; 428/593; 428/408; 428/902; 428/114; 428/105

[58] Field of Search ............... 428/119, 36, 116, 179, 428/186, 902, 184, 188, 166, 174, 268, 273, 593, 260, 290, 35, 408; 52/634, 642, 662, 690, 646, 636

[56] References Cited

U.S. PATENT DOCUMENTS

| | | | |
|---|---|---|---|
| 563,575 | 7/1896 | Lantzke | 428/178 |
| 1,141,067 | 5/1915 | Lloyd | 428/36 |
| 1,685,353 | 9/1928 | Dawson et al. | 52/634 |
| 2,029,048 | 1/1936 | Atwood | 154/2 |
| 2,170,484 | 8/1939 | Prat | 257/245 |
| 2,415,240 | 2/1947 | Fouhy | 52/639 |
| 2,968,456 | 1/1961 | Hanson | 244/123 |
| 3,041,719 | 7/1962 | Haseltine | 29/517 |
| 3,108,924 | 10/1963 | Adie | 161/127 |
| 3,123,907 | 3/1964 | Thomas | 29/455 |
| 3,228,822 | 1/1966 | Norman | 161/139 |
| 3,237,362 | 3/1966 | Fromson | 52/615 |
| 3,298,892 | 1/1967 | Lippay | 161/38 |
| 3,339,326 | 9/1967 | Derr et al. | 52/309 |
| 3,530,021 | 9/1970 | Reichl | 156/206 |
| 3,573,144 | 3/1971 | Anderson | 428/119 |
| 3,743,568 | 7/1973 | Wolf | 161/68 |
| 3,779,487 | 12/1973 | Ashton et al. | 264/123 |
| 3,918,289 | 11/1975 | Oswald et al. | 72/439 |
| 3,943,980 | 3/1976 | Rheaume | 428/255 |
| 4,001,474 | 1/1977 | Hereth | 428/188 |
| 4,051,289 | 9/1977 | Adamson | 428/116 |

*Primary Examiner*—Paul J. Thibodeau
*Attorney, Agent, or Firm*—Christensen, O'Connor, Johnson & Kindness

[57] ABSTRACT

Truss core panels comprising face sheets and a core, formed of adjoining tubes having an equilateral triangular cross-sectional shape, are disclosed. The face sheets are formed of either a homogeneous material (e.g., a metal, such as aluminum or titanium); or, a composite material, such as a laminate formed of bonded plies. The plies are woven from suitably strong fibers (e.g., glass or graphite), bonded together by a suitable resin. The tubes are also formed of either a homogeneous material or laminated from suitably strong fibers bonded together by a resin. Depending upon the material used, the tubes can be either formed by pultrusion or by machine winding on mandrels and cured. The tubes may be formed of the same material as the face sheets or different materials. Stiffening ribs and the like are formed by including additional layers of tubes. Further, the tubes may be filled continuously or intermittently, as desired, to accommodate fasteners. Since the tubes are equilateral triangles in cross-sectional shape, assembly of the tubes in one or more layers is fast and, therefore, inexpensive.

6 Claims, 7 Drawing Figures

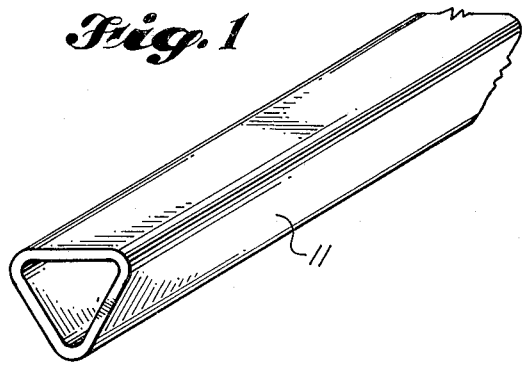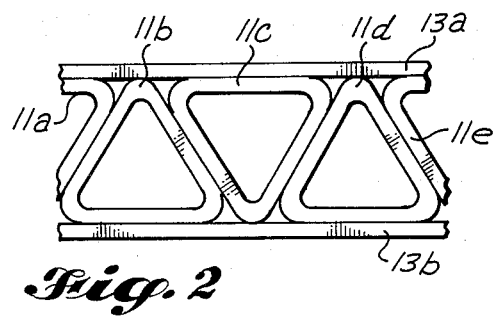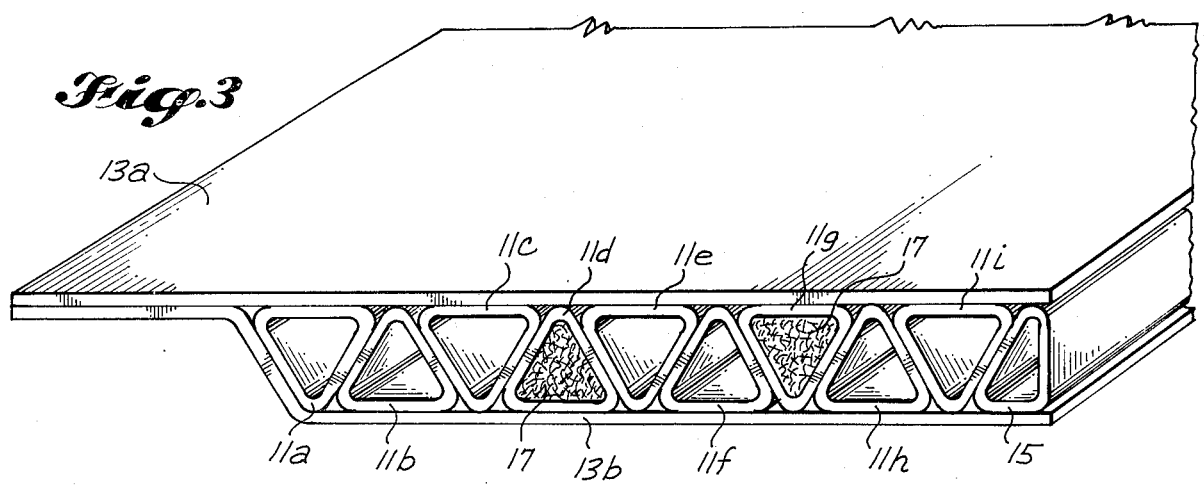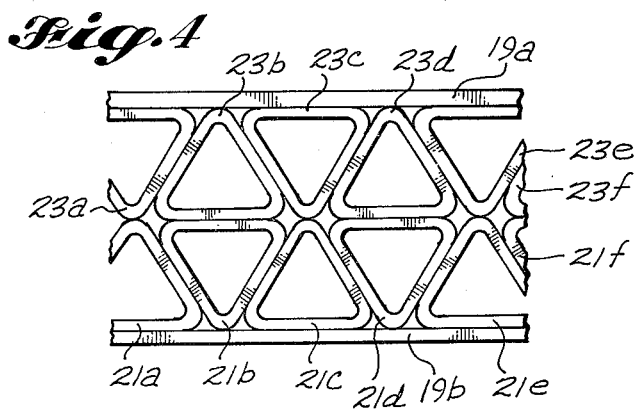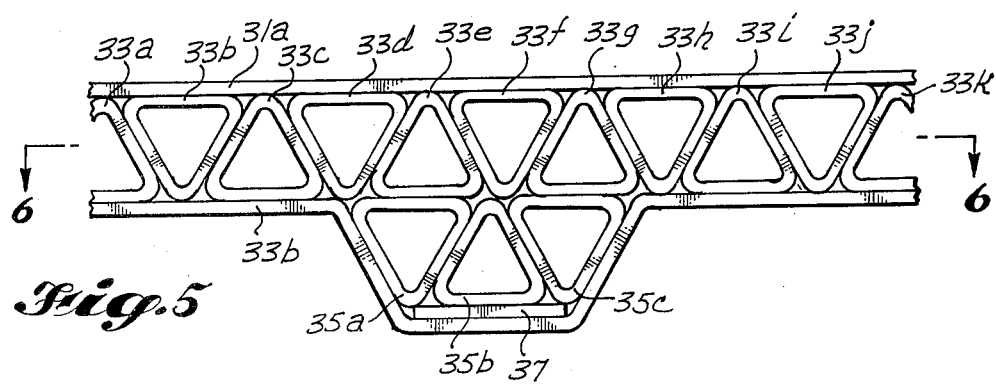

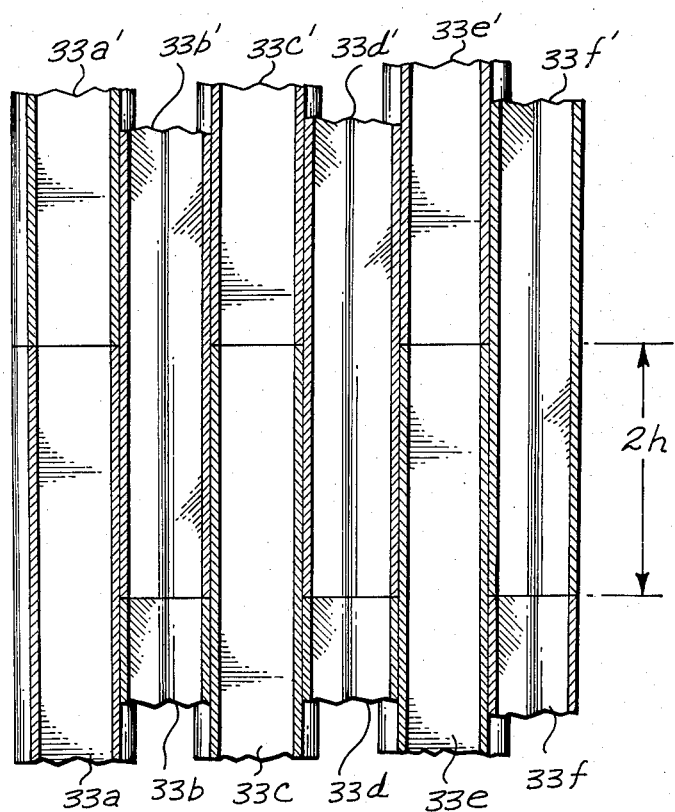
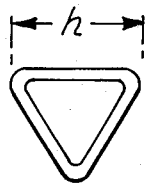
Fig. 6
Fig. 7

TRUSS CORE PANELS

BACKGROUND OF THE INVENTION

This invention is directed to hollow core panels and, in particular, truss core panels.

Various types of hollow core panels have been proposed by the prior art. While there may be exceptions, hollow core panels generally fall into one of two general groups—honeycomb core panels and truss core panels. Often, the terms "honeycomb core" and "truss core" have been confused. As used herein, honeycomb core panels are panels having a core structure formed of a multiplicity of adjacent cells, the walls of which intersect the face sheets of the panels, usually at right angles. Contrariwise, truss core panels are panels formed of a plurality of elongate core elements arrayed such that their longitudinal axes lie parallel to one another and parallel to the face sheets of the panels. The present invention is directed to truss core panels as thus defined.

Many prior art truss core panels include core elements that have a circular cross-sectional shape. The primary disadvantage of truss core panels that include such core elements is that their resistance to shear loads orthogonal to the longitudinal axis of the core elements is not as great as truss core panels that include core elements having other cross-sectional configurations, such as panels that include core elements having a rectangular cross-sectional configuration. On the other hand, circular core elements are relatively easy to assemble because they readily self-align with one another (and the enclosing face sheets) at tangent points, after they have been roughly arrayed in side-by-side positions; whereas, rectangular core elements must be individually positioned.

Thus, while core elements having a rectangular cross-sectional configuration are substantially stronger in shear than core elements having a circular cross-sectional configuration, rectangular core elements have assembly disadvantages. More specifically, rectangular (including square) core tubes cannot be merely roughly arrayed on a suitable face sheet and gently vibrated into position, as can be done with circular cross-sectional tubes. Rather, rectangular tubes must be individually positioned, which is a time-consuming manufacturing operation. Therefore, panels that include core elements having a rectangular cross-sectional shape are expensive to manufacture.

While proposals have been made to use core elements having cross-sectional configurations other than circular or rectangular, panels using such core elements have other disadvantages. For example, panels having corrugated core elements have been proposed. Corrugated core panels have the disadvantage that they are not as strong (for the same wall thickness) as either circular or rectangular core element panels. In addition, proposals have been made to use discontinuous triangular shaped core elements. One example of a panel including discontinuous triangular shaped core elements is described in U.S. Pat. No. 4,001,474 entitled "Honeycomb Panel Cellular Structure Having Triangular Cells" by Ralph F. Hereth. The problem with such panels is that the triangular shaped core elements are discontinuous or "broken" at one apex and, thus, not as strong as continuous elements. Further, the core elements described in this patent must be individually arrayed.

Therefore, it is an object of this invention to provide new and improved truss core panels.

It is a further object of this invention to provide truss core panels that are easy to assemble.

It is another object of this invention to provide truss core panels that are easy to assemble yet have orthogonal, longitudinal shear strength greater than the shear strength provided by truss core panels that include core elements having a circular cross-sectional shape, for the same wall thicknesses core elements.

In the past, both the core elements and the face sheets of high shear strength truss core panels usually have been formed of homogeneous materials such as metals or metal alloys. In recent years, various materials having high strength-to-weight ratios, such as glass and graphite fiber materials have been developed. Because of their strength-to-weight advantages, the use of these composite materials in many environments is desirable. In particular, panels formed of these materials are desirable in environments where strength-to-weight ratios are a significant factor. For example, strength-to-weight ratios are a significant factor in the choice of aircraft components because it is desirable to provide maximum strength for the least weight in order to economize on fuel.

Therefore, it is another object of this invention to provide truss core panels formed of a composite, rather than a homogeneous, material.

It is another object of this invention to provide truss core panels wherein the face sheets and/or core elements are formed of a composite material.

SUMMARY OF THE INVENTION

In accordance with this invention, truss core panels comprising face sheets and a core formed of tubes having an equilateral triangular cross-sectional shape are provided. The equilateral triangular cross-sectional shaped tubes are elongate and continuous. The tubes are arrayed in adjoining positions along parallel axes; and in one layer, or multiple layers, depending upon the desired thickness of the resultant panel. Because of their equilateral triangular cross-sectional shape, tube assembly time is low.

In accordance with further aspects of the invention, the face sheets may be formed of a homogeneous material, such as a metal or metal alloy; or, a composite material. A suitable composite material is a ply laminate wherein the plies are formed of suitably strong fibers bonded together. Similarly, the tubes may also be formed of a homogeneous material or a composite material. The composite material may be a ply laminate formed of suitably strong fibers bonded together by a resin. Examples of suitable homogeneous materials are aluminum or titanium alloys. Examples of fibers suitable for use in ply laminates are glass and graphite fibers. In the case of the face sheets, the ply laminates may be in the form of cloth made of glass or graphite fibers, bonded together by a suitable resin. In the case of the tubes, the glass or graphite fibers may be in the form of resin coated threads formed into the desired triangular cross-sectional shape by pultrusion, or by machine winding on mandrels, and cured.

In accordance with further aspects of the invention, selected ones of the tubes may be continuously or intermittently filled, as desired, to accomodate fasteners. In addition, the panels may be pan-edged by extending the face sheets beyond the edge of the core and bending one of the face sheets toward the other face sheet so that they join; and, then, extending the juxtaposed face sheets outwardly in the plane of the panel. Alternatively, the edges of the panel may be square-shaped by mounting special right triangular cross-sectional tube along the edges of the panel.

In accordance with still further aspects of this invention, rather than being entirely planar, the panels may include stiffening ribs or the like. The ribs are formed by creating one or more additional layers of triangular tubes in the regions where ribs are desired.

It will be appreciated from the foregoing summary that the invention provides new and improved truss core panels that have the assembly advantages of panels having cores formed of circular tubes; but with improved resistance to shear applied orthogonal to the longitudinal axes of the tubes. The invention provides further orthogonal, longitudinal shear strength improvement, for a particular weight panel, by forming some or all of the panel elements from high strength composite materials, as opposed to high strength homogeneous materials.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is an isometric view of one end of an equilateral triangular cross-sectionally shaped tube used in truss core panels formed in accordance with the invention;

FIG. 2 is a partial end view of a truss core panel, including a single layer of equilateral triangular cross-sectionally shaped tubes, formed in accordance with the invention;

FIG. 3 is an isometric view of one end of a truss core panel, including a single layer of equilateral triangular cross-sectionally shaped tubes, formed in accordance with the invention;

FIG. 4 is a partial, end view of a truss core panel, including two layers of equilateral triangular cross-sectionally shaped tubes, formed in accordance with the invention;

FIG. 5 is a partial end view of a truss core panel, formed in accordance with the invention, that includes a reinforcing rib;

FIG. 6 is a cross-sectional plan view of the interior of a truss core panel, taken along line 6—6 of FIG. 5, illustrating the end-to-end joining of equilateral triangular cross-sectionally shaped tubes; and, FIG. 7 is a cross-sectional view of a single equilateral triangular cross-sectionally shaped tube.

DESCRIPTION OF THE PREFERRED EMBODIMENTS

FIG. 1 is an isometric view of one end of an equilateral triangular cross-sectionally shaped tube 11, which forms the basic core element of a truss core panel formed in accordance with the invention. The equilateral triangular cross-sectionally shaped tube 11 illustrated in FIG. 1 may be formed of various materials, in various ways. For example, the equilateral triangular cross-sectionally shaped tube 11 may be formed of a homogeneous, high strength-to-weight, material such as an aluminum or titanium alloy. Tubes formed of such material may be created by conventional pultrusion techniques, for example. Alternatively, the equilateral triangular cross-sectionally shaped tube 11 may be formed of a composite material having an even higher strength-to-weight ratio. A suitable composite material is a ply laminate wherein the plies are formed of suitably strong fibers, such as glass or graphite fibers, bonded together by a suitable resin. The tubes may be formed by machine winding glass or graphite fibers, coated with a suitable resin, on a triangular forming mandrel so as to form a series of plies and, then, curing the resin. Alternatively, the equilateral triangular cross-sectionally shaped tubes may be formed by pulling a series of separate tapes formed of glass or graphite fibers, coated with a suitable resin, through a die (pultrusion) so that the desired number of tube layers are formed and, then, curing the resin.

In accordance with the invention, panels are formed using a plurality of tubes of the type illustrated in FIG. 1. An end, cross-sectional view of a part of the least complicated of such panels is illustrated in FIG. 2. The truss core panel illustrated in FIG. 2 includes a plurality of equilateral triangular cross-sectionally shaped tubes 11a, 11b, 11c, etc. formed in the manner described above, mounted between a pair of parallel face sheets 13a and 13b. The tubes are arrayed in parallel, with the "base" of adjacent tubes adjoining opposite face sheets. More specifically, as illustrated in FIG. 2, the leftmost completely viewable tube 11b has its base adjoining the lower face sheet 13b, the next tube 11c has its base adjoining the upper face sheet 13a and the next tube 11d has its base adjoining the lower face sheet 13b. This alternating arrangement extends across the entire panel. Moreover, inclined legs of adjacent tubes are juxtaposed. Further the apex of the tubes, opposite their bases, impinge on the opposing face sheet. For example, the apex of the leftmost completely viewable tube 11b impinges on the upper face sheet 13a.

As with the equilateral triangular cross-sectionally shaped tubes 11a, 11b, etc., the face sheets 13a and 13b may be formed of various materials. The face sheets may be formed of a homogeneous material such as an aluminum or titanium alloy. Alternatively, the face sheets may be formed of a composite material. For example, the face sheets may be laminated from suitably strong cloth plies, i.e., cloth plies formed of glass or graphite fibers bonded together by a suitable resin.

Preferably, the face sheets 13a and 13b are bonded to the tubes 11; and, the tubes are bonded together to the extent possible during assembly. In the case of panels that include aluminum or titanium tubes 11a, 11b, 11c, etc., and aluminum or titanium face sheets 13a and 13b, bonding is performed using conventional aluminum and titanium bonding techniques. In the case of truss core panels wherein the tubes and face sheets are formed of composite materials, as described above, the face sheets are preferably bonded to the tubes at the same time the face sheets are cured. More specifically, as previously discussed, the tubes are preformed and cured. Then, the tubes are assembled on a smooth support surface. Preferably, tube assembly is accomplished by roughly aligning the tubes and, then, vibrating them into their final position using a vibrating machine or by hand vibration action. Thereafter, one face sheet is formed atop the tube assembly by building up a laminate of plies impregnated with a suitable resin. Next the face sheet and the tube assembly is inverted and the other face sheet is formed atop the inverted structure in the same manner that the first face sheet was formed. Thereafter, the entire panel structure is placed in an autoclave and cured. Depending upon the processing used, curing of the entire panel may take place at a lower temperature than curing of the truss core tubes. A certain amount of bonding between adjacent truss core tubes will occur in the regions where the face sheet resin flows, even though complete interstitial bonding between facing tubes will not take place because the tubes were cured prior to assembly.

It is pointed out here that, while it is generally preferable to form both the tubes and the face sheets of similar materials, in some instances, it may be desirable to form the tubes and the face sheets of dissimilar materials. For example, the tubes may take the form of laminated plies joined by a suitable resin and the face sheets may be formed of aluminum or titanium. Alternatively, the tubes may be formed of aluminum or titanium and the face sheets formed of laminated plies bonded together by a suitable resin. Still further, other materials may be used.

FIG. 3 is an isometric end view of a truss core panel having a core similar to the core illustrated in FIG. 2, i.e., a core formed of a single layer of triangular tubes 11a, 11b, 11c, etc., each of which has an equilateral triangular, cross-sectional shape. FIG. 3 illustrates two different ways of forming the edges of the panel lying parallel to the longitudinal axis of the arrayed tubes. The left edge of the truss core panel illustrated in FIG. 3 is pan-shaped and the right ledge is square-shaped. The pan-shaped edge is formed by bending the lower face sheet 13b so that it follows the outer inclined leg of the leftmost tube 11a until the lower face sheet 13b meets the upper face sheet 13a. At this point the lower face sheet 13b bends outwardly so as to lie against the outwardly extending inner side of the upper face sheet 13a i.e., the face sheets are juxtaposed. In this manner a pan-shaped edge equal in thickness to the combined thickness of the upper and lower face sheets 13a and 13b is formed.

The right edge of the truss core panel illustrated in FIG. 3 is squared by terminating the core with a right triangular cross-sectionally shaped tube. Specifically, the core of the truss core panel illustrated on the right side of FIG. 3 is terminated by an end tube 15 that is cross-sectionally equal to one-half of one of the equilateral triangular cross-sectionally shaped tubes 11a, 11b etc. forming the main portion of the core. More specifically, the end tube 15 has a right triangular cross-sectional shape formed by bisecting one of the equilateral triangular cross-sectionally shaped tubes 11a, 11b, etc. Of course the tube is continuous, i.e., the tube is not open, rather it is closed by a bisecting leg. Thus, the end tube in addition to having a right angle corner, also has corners that circumscribe angles of 60 and 30 degrees. (The corners of each of the equilateral triangular cross-sectionally shaped tubes, of course, circumscribe angles of 60 degrees.) When the end tube 15 is appropriately positioned, the hypotenuse leg faces the adjacent equilateral triangular cross-sectionally shaped tube 11i, the short leg faces one of the face sheets and the long (bisecting) leg forms the edge of the truss core panel.

FIG. 3 also illustrates that selected regions of one or more of the core tubes may be filled by a suitable filler material 17. That is, all or selected ones of the core tubes may be filled, continuously or intermittently, with a lightweight filler material adapted to receive fasteners, e.g., screws. In this way, a means for receiving fasteners, which may be used to attach the panels to other structures, or other structures to the panels, as desired, is provided. Such filling is of particular importance when core tube and face sheet thicknesses are low and generally inadequate to receive and hold fasteners themselves.

FIG. 4 is an end view of a truss core panel formed in accordance with the invention that includes two layers of equilateral triangular cross-sectionally shaped tubes, rather than one layer. More specifically, the truss core panel illustrated in FIG. 4 comprises: upper and lower face sheets 19a and 19b; a lower layer of equilateral triangular cross-sectionally shaped tubes 21a, 21b, 21c and 21d, etc.; and, an upper layer of equilateral triangular cross-sectionally shaped tubes 23a, 23b, 23c, etc. Both the equilateral triangular cross-sectionally shaped tubes and the face sheets can be formed in any of the manners previously described. Consequently, the only difference between the truss core panel illustrated in FIG. 4 and the truss core panels illustrated in FIGS. 2 and 3 is that it is twice as thick, because two layers of core tubes, rather than a single layer are utilized. Obviously, more than two layers of tubes can be utilized to form a panel, if desired. Moreover, rather the longitudinal axis of the tubes in both layers being parallel, as shown, the longitudinal axes of the tubes in one layer can lie orthogonal to the longitudinal axes of the tubes in the other layer.

FIG. 5 is an end view of a truss core panel formed in accordance with the invention wherein major regions of the panel include a single layer of equilateral triangular cross-sectionally shaped tubes and selected (rib) regions include an additional layer of tubes. More specifically, FIG. 5 illustrates a truss core panel comprising: upper and lower face sheets 31a and 31b; an upper layer of equilateral triangular cross-sectionally shaped tubes 33a, 33b, 33c, etc; a lower layer of three equilateral triangular cross-sectionally shaped tubes 35a, 35b and 35c, which define a rib; and, a reinforcing plate 37. The upper row of tubes 33a, 33b, 33c, etc., adjoin the upper face sheet, which is planar. The three tubes 35a, 35b and 35c, which define a rib, lie side-by-side one another and adjoin the tubes forming the upper layer. All of the equilateral triangular cross-sectionally shaped tubes have parallel longitudinal axes. Thus, in essence, the tubes defining the rib form a second tube layer of limited width. The reinforcing plate adjoins the lower surface of the rib defining tubes 35a, 35b and 35c. Preferably, the outer two of the three rib defining tubes have their bases adjoining the upper layer of tubes and the base of the center tube of the rib defining tubes adjoins the reinforcing plate 37. The lower face sheet 31b "follows" the exposed lower surfaces of the various tubes and the reinforcing plate 37. Thus, the lower facing sheet 31b parallels the upper facing sheet 31a in the regions where a single layer of tubes exist. Where a double layer of tubes exist, the lower facing sheet bends around the rib defining tubes and the reinforcing plate.

As with the previously described embodiments of the invention, the equilateral triangular cross-sectionally shaped tubes forming the core of the truss core panel illustrated in FIG. 5 may be formed of a homogeneous material, such as an aluminum or titanium alloy, or may be formed of a composite material (e.g., glass or graphite fibers bonded together). Similarly, the face sheets may be formed of a homogeneous material or a composite material. Further, the lower reinforcing plate 37 may be formed of a homogeneous material or a composite material.

FIG. 6 is a cross-sectional plan view of a series of tubes forming a truss core panel, such as the panel illustrated in FIG. 5, and illustrates the preferred amount of overlap that should exist if the tubes must be joined end-to-end in order to extend the full length of the panel. More specifically, FIG. 6 illustrates two sets of parallel equilateral triangular cross-sectionally shaped tubes 33a–33f and 33a'–33f'. Alternate tubes of each set, i.e., 33a, 33c and 33e and 33a' and 33e' have their bases adjoining one face sheet and the other tubes, 33b, 33d and 33f and 33b', 33d' and 33f' have their bases adjoining the other face sheet as previously described. In addition, the ends of alternate ones of the first set of tubes, i.e., 33a, 33c and 33e project beyond the ends of the other tubes 33b 33d and 33f of that set by a distance equal to 2h, where h is the width of a leg of one of the tubes, as shown in FIG. 7. Correspondingly, the ends of the alternate tubes of the second set 33a', 33c' and 33e' are shorter than the other tubes 33b', 33d' and 33f' of that set by a distance equal to 2h. As a result, when the sets of tubes are joined in an end-to-end manner so that related tubes meet (i.e., 33a meets 33a', 33b meets 33b' etc.) the tube sets are interleaved by a distance equal to 2h. An overlap distance of 2h (or more) provides adequate shear strength for most environments.

It will be appreciated from the foregoing description that the invention provides new and improved truss core panels. Because the core elements are formed of tubes having equilateral triangular cross-sectional shapes, the tubes are easily assembled. In fact, in many instances, they can be roughly aligned on a flat support plate and vibrated into place either mechanically, or manually, with little effort. Thus, layout and assembly is substantially as easy as assembling tubes having circular cross-sectional configurations. However, the shear strength of equilateral triangular cross-sectionally shaped tubes is substantially greater than the shear strength of tubes having circular cross-sectional shapes. Consequently, for tubes of the same wall thickness, ease of assembly is maintained while strength is increased. The truss core panels have the further advantage that they can be easily formed of non-homogeneous materials having high strength-to-weight ratios, such as composite materials formed of laminated plies joined together by a suitable resin.

While preferred embodiments of the invention have been illustrated and described, it will be appreciated that various changes can be made therein without departing from the spirit and scope of the invention. Hence, the invention can be practiced otherwise than as specifically described herein.

The embodiments of the invention in which an exclusive property or privilege is claimed are defined as follows:

1. A stiffened truss core panel comprising:
   a first face sheet;
   a primary layer of elongate hollow tubes, each of said elongate hollow tubes having a continuous equilateral triangular cross-sectional shape, said elongate hollow tubes being positioned side-by-side such that two alternating sets of tubes are formed, the bases of one of said alternating sets and the apices of the other of said alternating sets adjoining said first face sheet and being affixed thereto;
   at least one reinforcing rib layer of elongate hollow tubes affixed to a selected region of said primary layer of elongate hollow tubes on the side thereof remote from the side affixed to said first face sheet, each of said elongate hollow tubes having a continuous equilateral triangular cross-sectional shape, said elongate hollow tubes being positioned side-by-side such that two alternating sets of tubes are formed, the bases of one of said alternating sets of tubes and the apices of the other of said alternating sets of tubes of said rib layer adjoining the apices of said one of said alternating sets of tubes and the bases of said other of said alternating sets of tubes of said primary layer, the longitudinal axes of said reinforcing rib layer of elongate hollow tubes lying parallel to the longitudinal axes of said primary layer of elongate hollow tubes; and,
   a second face sheet affixed to the surface of said primary and reinforcing rib layers of elongate hollow tubes opposed to the surface of said primary layer attached to said first face sheet and opposed to the surface of said reinforcing rib layer attached to said primary layer.

2. A stiffened truss core panel as claimed in claim 1 wherein said first and second face sheets and said elongate hollow tubes forming said primary and reinforcing rib layers are formed of a composite material.

3. A stiffened truss core panel as claimed in claim 2 wherein said composite material comprise plies which are woven from fibers bonded together by a suitable resin.

4. A stiffened truss core panel as claimed in claim 3 wherein said fibers are glass fibers.

5. A stiffened truss core panel as claimed in claim 3 wherein said fibers are graphite fibers.

6. A truss core panel as claimed 3 wherein selected regions of said elongate hollow tubes forming said primary and reinforcing rib layers are filled with a material suitable for receiving and retaining fasteners.

* * * * *